C. F. KETTERING.
ELECTRIC METER.
APPLICATION FILED MAY 29, 1912

1,154,025.

Patented Sept. 21, 1915.

Witnesses
Walter W. Riedel
Joseph W. McDonald

Inventor
Charles F. Kettering
By Kerr, Page, Cooper & Hayward
Attorneys.

UNITED STATES PATENT OFFICE.

CHARLES F. KETTERING, OF DAYTON, OHIO, ASSIGNOR TO THE DAYTON ENGINEERING LABORATORIES CO., A CORPORATION OF OHIO.

ELECTRIC METER.

1,154,025.   Specification of Letters Patent.   Patented Sept. 21, 1915.

Application filed May 29, 1912. Serial No. 700,487.

*To all whom it may concern:*

Be it known that I, CHARLES F. KETTERING, a citizen of the United States, residing at Dayton, county of Montgomery, and State of Ohio, have invented certain new and useful Improvements in Electric Meters, of which the following is a full, clear, and exact description.

This invention relates to an improvement in electrical measuring devices and is especially designed to provide a device or instrument of this character, wherein the various parts of the measuring device which are insulated or removed from the normal path or circuit of the electric current which is adapted to pass through the meter, will be protected from the injurious and damaging effects of short or abnormal circuits which may be accidentally or inadvertently made or created through said parts, in a variety of ways.

Further and incidental objects and advantages of the present invention will be apparent from the following description, reference being had to the accompanying drawing, wherein a preferred embodiment of one form of the present invention is clearly illustrated.

Figure 1:
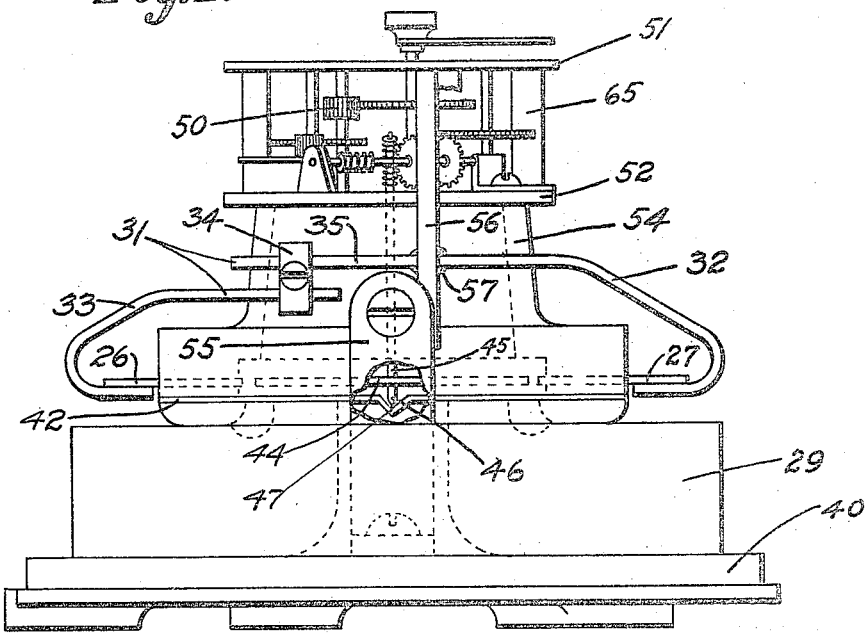
Figure 2:
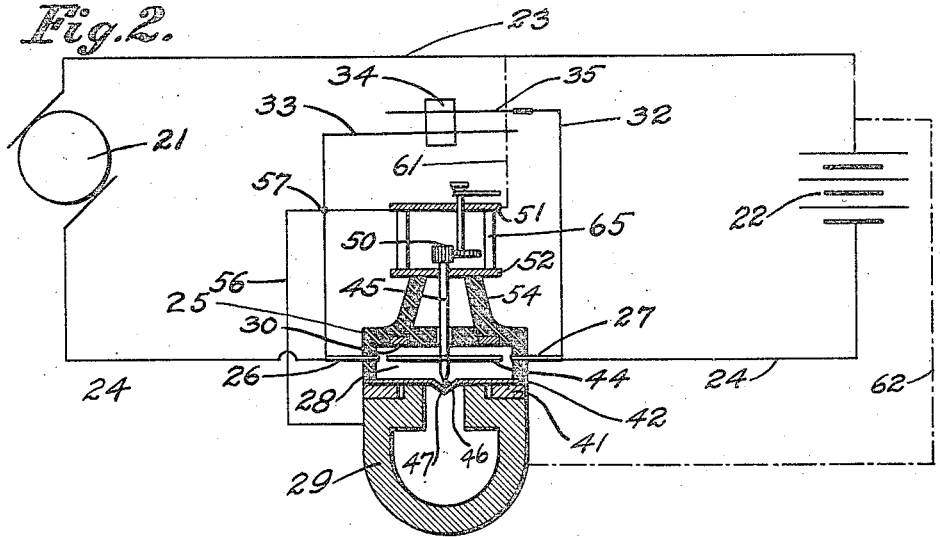

Referring to the drawings, Figure 1 is a view in elevation of the electrical measuring device embodied in the present invention. Fig. 2 is a diagrammatic view showing the electrical connections and devices included in the present invention.

Referring to the drawing, the electrical measuring instrument disclosed in Fig. 1 is of that type known as an electrical mercury meter, and of substantially the same type as that embodied in my co-pending application, filed April 17, 1911, Serial No. 621,512.

While the present invention is herewith shown and described as being combined with a specified type of meter, it should be understood that the invention is not limited in its application, to meters of this type alone, but that it may be combined with various types of meters or other electrical measuring instruments.

It should be understood that in the following description and accompanying illustration, wherein the meter is described and shown as being interposed in an electric circuit, between a suitable current generator and by said illustration and description, inasmuch as the present invention is applicable to meters included in substantially any electric circuit where it is desired to ascertain the amount of current passing therethrough.

Referring to the diagrammatic showing in Fig. 2, the numeral 21 designates an electrical machine of any approved type, which may be either an electric generator or a motor-generator, of that type, described and shown in the above named co-pending application. This electric generating machine is placed in circuit with an accumulator or storage battery 22, by means of the wires 23 and 24.

The line wire 24 is broken in order to allow the interposition of the meter 25, one portion of the wire 24 being connected with the terminal 26 of the meter, while the other portion of the wire 24, is connected with the terminal 27 of the meter. These terminals 26 and 27 lead to the mercury chamber 28 of the meter in the usual manner and are adapted to convey the current into the mercury chamber. This chamber is provided with a body of mercury which completes the circuit between the terminals 26 and 27. By having permanent magnets 29 arranged in the bottom of said chamber and a soft iron ring 30, arranged in the top wall of the chamber, it will be seen that a magnetic field will be set up between the magnets and ring. From the above arrangement, *i. e.*, the positioning of the mercury intermediate the magnets 29 and the ring 30, it will appear that current flowing through said mercury will necessarily pass through the field and thus actuate the armature 44 in either direction in accordance with the direction of flow of the current. This armature 44 constitutes the main operating member of the meter and is preferably of the copper disk type.

In order to prevent injurious effects from the mercury coming in contact with the armature, a coating of any suitable substance, which is not affected by mercury, is applied to the armature.

Where a large number of these meters or measuring devices are to be employed in any given system, it is desirable to have the meters measure uniformly to some predetermined standard, and inasmuch as there will be certain variations in the elements be made for securing a substantially uniform measurement by the meter. In the present instance, a variable shunt circuit 31, having a portion thereof, of relatively high resistance, is secured to the terminals 26 and 27 and is adapted to shunt a certain predetermined amount of current about the meter, from one portion of the wire 24, to the other. This shunt circuit is made up of a pair of members 32 and 33, having an adjustable block or nut connection 34.

A portion of the member 32, as at 35, is made of higher resistance than the remaining part of said member and the member 33, so that it will be seen, that by shifting the adjustable block or nut 34 laterally on the members 32 and 33, the resistance of the shunt circuit may be increased or decreased as conditions warrant.

Referring to Figs. 1 and 2, the measuring device itself comprises a base plate 40, whereon are mounted the magnets 29. Opposite the pole pieces of the magnets 29, a soft iron ring 30 is positioned in the top wall of the mercury chamber, whereby the flux of the magnets 29 will be directed through the disk 44. A supporting ring or plate 41 is connected with the magnets in any suitable manner and supports a thin metallic plate 42. See Fig. 2. This plate 42 forms the bottom wall of the mercury chamber 28, wherein the armature 44 is so positioned that it is free to rotate. The upper face of this plate is enameled to protect the same against amalgamation with the mercury.

The spindle 45 carrying the armature 44, is provided at its lower end with the bearing member 46, which fits in a socket 47, formed in the plate 42, while at its upper end, this spindle is provided with a suitable gear wheel which meshes with one of the gear wheels of the gear train 50. The socket 47, formed in the plate 42, is free from enamel or other insulation.

The gear train 50, mounted between the upper and lower train plates 51 and 52 respectively, is superposed upon a block of insulation 54, which is so formed that when mounted upon the plate 42, the mercury chamber 28 is substantially inclosed.

In the testing of instruments of this character, and also in the assembling of instruments in electrical systems of the character heretofore described, there is always a liability that an external short circuit will be created between the upper or exposed train plates and the opposite line of the battery from that which passes through the meter; or between the said battery line and the magnets or conductive elements located below the mercury chamber of the meter, by some external conductor. For instance, this conductor may comprise merely an instrument which is used in the assembling of the systems, or by having supplemental connections which may be so displaced, as to cause external short circuits, with the parts above mentioned.

When short circuits are created in the above named ways or in any other manner, the current will pass through the bearing 46 of the spindle 45, or through the various pinions of the gear train 50, and as the amperage of the current will be much greater than the normal capacity of the spindle or bearing, it will result in the burning out thereof.

Under certain circumstances, the various spindles and their bearings which are mounted between the upper and lower train plates of the meter, may be subjected to the same injurious effects, as for instance, in cases where the supporting studs 65, are made of insulating material, rather than from conductive material. Of course, it will be understood that when the studs 65 are constructed of conductive material, the capacity of said studs will prevent, as a general rule, any injury to the spindles and the bearings between the train plates 51 and 52.

The present invention is designed primarily to take care of any undesirable external short circuits which may be created in any manner, between the various parts of the meter. This is accomplished by securing a suitable conducting element, such as for instance, a copper plate or wire 56, to the train plate 51 and the bracket 55, said bracket being in turn connected to the magnets 29, as shown in dotted lines in Fig. 1. Intermediate the ends of the said conducting element 56, one of the members of the shunt circuit 31 is connected in any suitable manner, as for instance, by a soldered joint, as shown at 57, in Fig. 2.

With the application of the present invention, to meters of the type herein shown and described, the course of the current, forming an external short circuit between the upper or lower train plates and the line of the circuit designated by the numeral 23, will be as follows: from a given electrical source, such as the motor-generator 21, shown in Fig. 2, through wire 23, thence through whatever medium may be causing the short circuit, as shown in dot and dash line 61, in Fig. 2, through the protective conducting strip 56, thence through the shunt circuit 31, into the other portion of the wire 24, thus preventing an abnormal amount of current from passing through the spindle end bearings of the various gear wheels of the gear train and thereby obviating all detrimental or injurious effects of the short circuit, on the protected element. Substantially the same action occurs when the short circuit is created between the magnets or elements located below the mercury chamber of the meter and the line 23 of the main circuit, as is shown by the dot and dash line 62;

that is, the current will seek the course of least resistance, and pass through the conducting strip 56, into the shunt circuit 31 and thence to the main line wire 24, whereby the spindle 45, of the armature and the end bearing 46 thereof, will be protected from an overload of electrical current.

As is shown in Fig. 2 of the drawings, the protective strip, or low resistance element 56, is connected with the shunt 31 at the point 57. It will therefore be seen that this is the same in effect as though the strip 56 was connected directly with either the terminal 26 or the terminal 27.

Under certain conditions, as for instance, where the meter is used in portable electrical systems, the meter is liable to be tilted to such an angle that the mercury within the chamber 28, will flow to one side thereof, and thus open or break the circuit between the terminals 26 and 27. Under these conditions, the shunt 31 is of especial value, inasmuch as the entire flow of current will be directed through the shunt 31, so that the burning out of the meter will be prevented, and also the main circuit of the electrical system will be maintained in closed condition. Now, if any short circuits are created, as has heretofore been explained, and the protective strip 56 is connected with the shunt 31 and to the conductive elements which are removed from the normal path of the current, the current which will tend to flow through the short circuit, will be shunted through the protective strip 56 to the shunt 31 and thence through its normal circuit, instead of through the armature spindle 45 or through the various pinions of the gear train 50. In certain other systems, however, the employment of the shunt 31 becomes unnecessary and is entirely eliminated from the meter. Under these conditions, the protective strip 56 will be connected directly with the terminals 26 or 27, so that the pinions of the gear train 50, and the armature spindle 45 will be protected from the effects of any short circuits which are created in the manner heretofore set forth.

It will, of course, be understood that various changes in the structure and application of the present invention, may be made to meet various conditions, and I reserve the right to make such changes and alterations, as may come within the scope of the present invention.

What I claim is as follows:

1. In an electrical measuring instrument having circuit connections; a normal circuit for electrical current through the measuring instrument; elements of conductive material forming part of the measuring instrument but removed from the normal circuit of the current; and means electrically connecting said elements and the circuit connections.

2. In an electrical measuring instrument, an electric circuit adapted to pass current through said instrument; elements forming parts of said instrument and conductively connected with said circuit; and a low resistance element connecting said parts with the circuit external to the measuring instrument.

3. In an electrical measuring instrument having an armature, the combination of auxiliary elements conductively connected to said armature; and means for preventing injurious short-circuits from passing through said auxiliary elements when circuits of this sort tend to pass through said elements.

4. In an electric meter having an armature, circuit connections therewith; a shunt circuit external to said meter and connected with said circuit connections; auxiliary meter elements having conductive connection with said armature, and means connected with said elements and the shunt circuit, whereby short-circuits tending to pass through said auxiliary elements will be shunted around said elements.

5. In a mercury meter, comprising a mercury chamber; an armature positioned therein, and having a bearing on the lower wall thereof; a registering mechanism comprising a gear train having conductive connection with the mercury chamber; and means for preventing injurious short circuits through said gear train and said bearing when circuits of this sort tend to pass therethrough.

6. In a device of the character described, the combination with an electrical circuit; of an electrical measuring instrument interposed in one line of said circuit, having conductive elements removed from the normal circuit of the current through the measuring instrument; and means for conductively connecting the said elements with the line of the circuit in which the instrument is interposed, whereby short circuits which may be created between the conductive elements and the opposite line of the circuit will be shunted around the conductive elements, to the line of the circuit which includes the measuring instrument.

7. In an electrical system having circuit connections; a measuring instrument connected to one of said circuit connections and having portions thereof normally outside of said circuits but susceptible of being short-circuited; and means for preventing injurious short-circuits through said parts when circuits of this sort tend to pass therethrough.

8. The combination with an electrical measuring device having a main circuit therethrough; of a shunt circuit around said main circuit; conductive auxiliary elements of said meter removed from said main circuit but conductively connected therewith; and a permanent electrical connection between said shunt circuit and said auxiliary elements.

9. The combination with an electrical measuring instrument having a main circuit therethrough; conductive auxiliary elements of said meter conductively connected to said circuit; and electrical connections between said auxiliary elements and one of the terminals of the main circuit to prevent injurious short-circuits through said element.

10. In an electrical system having circuit connections; a measuring instrument interposed in said circuit and having ingoing and outgoing terminals; auxiliary elements of said measuring device removed from said circuit but conductively connected therewith and permanent electrical connections between said auxiliary elements and one of the terminals of the measuring device whereby injurious short-circuits tending to pass through said auxiliary elements will be shunted through said permanent electrical connections and around said elements.

In testimony whereof I affix my signature in the presence of two subscribing witnesses.

CHARLES F. KETTERING.

Witnesses:
 WM. BOHLEBER,
 FELIX THOMAS.

Copies of this patent may be obtained for five cents each, by addressing the "Commissioner of Patents, Washington, D. C."